United States Patent [19]

Belanger et al.

[11] Patent Number: 5,784,748
[45] Date of Patent: Jul. 28, 1998

[54] VEHICLE LAUNDRY IMPLEMENT AND REPLACEABLE CLOTH ELEMENTS FOR USE THEREWITH

[75] Inventors: Michael J. Belanger, Novi; Robert J. Wentworth, Farmington Hills, both of Mich.

[73] Assignee: Belanger, Inc., Northville, Mich.

[21] Appl. No.: 641,024

[22] Filed: Apr. 29, 1996

[51] Int. Cl.[6] ........................................ B60S 3/06
[52] U.S. Cl. .......................... 15/230.14; 15/230.16; 15/97.3
[58] Field of Search ........ 15/97.3, 230, 230.13–230.17, 15/230.19, 231; 451/DIG. 2, 466

[56] References Cited

U.S. PATENT DOCUMENTS

| | | | |
|---|---|---|---|
| 537,687 | 4/1895 | Keighley | 15/230.14 |
| 2,039,677 | 5/1936 | Brooks | 15/230.14 |
| 2,226,624 | 12/1940 | MacFarland et al. | 15/230.14 |
| 2,384,599 | 9/1945 | Case | 15/230 |
| 2,484,994 | 10/1949 | Hall | 15/230.14 |
| 2,645,065 | 7/1953 | Kietzmann | 15/230.14 |
| 3,067,444 | 12/1962 | Dickson et al. | 15/97.3 |
| 4,967,440 | 11/1990 | Belanger | 15/230.14 |
| 5,127,123 | 7/1992 | Belanger | 15/230.14 |

FOREIGN PATENT DOCUMENTS

| | | | |
|---|---|---|---|
| 1-122759 | 5/1989 | Japan | 15/DIG. 2 |
| 222656 | 10/1968 | U.S.S.R. | 15/230.14 |

*Primary Examiner*—Terrence Till
*Attorney, Agent, or Firm*—Young & Basile, P.C.

[57] ABSTRACT

A rotatable vehicle laundry brush comprising a center shaft and a plurality of axially stacked hollow blow-molded spacers which are pinned and clamped together with felt discs sandwiched between the spacers and extending radially outwardly therefrom so as to translate in an edgewise manner when the brush rotates. The felt discs are made up from pie-shaped or rectangular brush elements the outer peripheries of which are subdivided into sample and/or compound fingers by a pattern of long and short slits. Brush elements are also provided which translate in a facewise manner. Brush material is minimized and reconstruction of the brush is made more efficient.

24 Claims, 6 Drawing Sheets

VEHICLE LAUNDRY IMPLEMENT AND REPLACEABLE CLOTH ELEMENTS FOR USE THEREWITH

FIELD OF THE INVENTION

This invention relates to laundering implements of the type having multiple cloth elements which contact the surface of a vehicle or other structure to be treated. The implement itself and the elements are designed to facilitate replacement of the elements for the purpose of rebuilding the implement and to reduce the amount of material needed to construct an implement of given size.

BACKGROUND OF THE INVENTION

Vehicle laundry systems have evolved from designs comprising only rotatable top and side brushes with long polypropylene strands toward the use of brushes and curtains with cloth elements made of rectangular, nonwoven, synthetic felt, usually of rectangular shape. The mounting end of the element is formed by folding the material of the element back over a plastic insert and thereafter stitching the folded material to form an edge bead which is inserted into a slotted carrier or hub. See, for example, U.S. Pat. Nos. 4,055,028 and 4,018,014 issued Oct. 25, 1977 and Apr. 19, 1977, respectively, to James A. Belanger.

A typical hub used to carry the elements of a rotary brush has eight uniformly circumferentially spaced slots to slidingly receive the edge bead of the cloth elements. In addition, the hub is constructed to be clamped to a center shaft for rotation therewith. Each hub is approximately six or eight inches in axial length and a number of the hubs are arranged in axial series on the shaft to build up a brush of desired length.

Brushes and curtains constructed entirely as described above tend to be somewhat noisy in operation and require substantial effort to rebuild. Noise is a result of the fact that the rectangular elements move facewise; i.e., they translate in a direction which is at right angles to the planes of the elements so as to effectively slap against the vehicle surface to be washed. The task of rebuilding a brush or curtain after the cloth elements have worn beyond the point of optimum effectiveness is made difficult by the fact that the hubs or carriers must be at least partly disassembled, 100 or more individual elements removed and an equal number of elements carefully and manually inserted into the slots in the hubs or carriers. Thereafter, the hubs or carriers are reassembled to the shaft or swingable racks to produce an essentially new brush or curtain. The difficultly of this task is such that it may discourage vehicle laundry operators from performing the reconstruction task as often as would be desirable to maintain optimal efficiency and effectiveness in the vehicle laundering operation.

SUMMARY OF THE INVENTION

According to one aspect of the present invention, a vehicle laundry implement is provided in which the slapping action of the individual elements is eliminated for at least some of the elements of an implement thereby to substantially quiet the contact of the elements on the vehicles while maintaining the full efficiency of the vehicle laundering operation. In general, this is accomplished by and through the use of a cloth element and element carrier design in which at least some of the cloth elements are arranged in spaced parallel relationship and all of the elements are captured between the mating surfaces of stacked, parallel spacers which can be clamped together for operation and unclamped and separated enough to easily remove and replace the cloth elements. The cloth elements require no inserts and, therefore, do not require tedious or difficult insertion into slots and are, therefore, easily removed and replaced and are less expensive to manufacture. In some cases, all stitching is eliminated.

As hereinafter described and illustrated in detail with reference to an implement in the form of a brush, a brush is made up of one or more cloth elements of brush material arranged in a circle or an approximation thereof and slitted to form radial fingers which contact the surface to be treated. The cloth elements may be rectangular or partially or fully circular and are mounted on and between axially stacked and clamped spacers. Some or all of the cloth elements may be mounted between the spacers in such a fashion so as to permit a degree of pivoting movement to reduce the tendency of the elements to cling to external vehicle appendages such as mirrors.

According to another aspect of the invention, the brush elements are slitted to exhibit compound radial fingers at the vehicle contacting edge characterized by relatively deep and widely spaced sub-fingers some or all of which are in turn subdivided into shallower and narrower fingers to soften and quiet the operation thereof while maximizing the coverage and effectiveness of the brush elements in the laundering operation.

The term "laundering," as used herein, refers primarily to the operation of wet washing a vehicle but shall also be construed to include wet and dry polishing functions as well.

According to another aspect of the invention, individual vehicle laundry brush and/or curtain elements are provided which require no bead inserts and which are constructed and arranged such as to minimize the time and difficulty involved in attaching the elements to a carrier.

These objectives are achieved through the construction of a non-woven fabric body having a surface-contacting edge and, opposite said edge, one or more mounting/driving holes for cooperation with a pin or pins projecting from a carrier/spacer. Shape can vary from rectangular strips to sectors of a circle to complete circles. As illustrated hereinafter, the cloth elements are slitted to enhance scrubbing action.

In a first preferred form hereinafter described, the cloth elements exhibit compound fingers consisting of relatively wide and radially deep fingers most or all of which are subdivided into more shallow and narrower subfingers. In a rotatable brush, multiple elements are arranged to form essentially circular arrays between spacers. Where a brush of fixed diameter and less compliance is desired, the elements are mounted between spacers with two mounting/drive pins per element; where a brush or brush portion of effectively variable diameter and greater compliance is desired, the elements are loosely mounted between spacers on only one pin per element, thus allowing the elements to swing or "give" if an obstacle is encountered. Brushes having a mix of one and two-locator pin per element are possible and recommended for certain applications. For swingable elements, bushings may be placed on the mounting pins to maintain spacing between brush spacers and to improve wear.

In another preferred form, a brush element is provided which is compatible with the simple, drive pin-mounting arrangement of the present invention, yet operates in the traditional fashion of translating facewise for enhanced contact.

This is achieved by providing one end of, for example, a rectangular cloth element with a planar extension portion which contains the pin-receiving hole or holes and which extends at right angles to the plane of the element itself. It is preferred to form this extension portion integrally by folding the element along mirror-image diagonals a distance from the mounting end of the element and bringing the resulting right-angular portions into face to face relationship and forming a common pin-receiving hole through them. The mounting portion, being orthogonal to the element proper, can be placed over a mounting pin which is parallel to the brush axis, yet the element proper extends radially outwardly in the traditional flap style in facial translation when the brush rotates.

A brush of composite character may be constructed using a predetermined combination of flat, edgewise-translating elements and non-flat, facewise-translating elements as is desired to suit a given application.

According to still another aspect of the invention, a vehicle laundry implement is provided which facilitates rebuilding, which is light in weight and which accommodates cloth elements in a stacked array. In general, this is accomplished by and through the combination of a plurality of spacer bodies of hollow lightweight, preferably plastic construction arranged in parallel, stacked relation and having in each case at least one face which lies adjacent to but not necessarily in contact with a mating face of an adjacent spacer. At least one of the end-most spacers may be secured to a drive element such that a rotary drive force may be imparted to the spacers and to the cloth elements captured therebetween. The cloth elements disposed between the mating faces of the adjacent spacers are preferably held in place by pins which extend between the faces of the spacers. The word "pin," as used herein, denotes a linking element generally and need not be dowel-like or cylindrical in shape.

As hereinafter described, the pins are preferably plastic and are provided in some or all cases with external bushings for wear resistance.

As is hereinafter illustrated in detail, the spacers which are used to construct a rotating brush are annular and are stacked to define the basic outline of the brush. The adjacent mating faces of the spacers are non-planar; i.e., constructed with an undulating or wave-like characteristic to effectively spread the cloth elements and increase the scrubbing range thereof while reducing the number of elements required for any given implement. The undulating configuration also results in the fingers being swept both upwardly and downwardly against substantially all points on the surface of the vehicle as it moves past the brush. This results in a more thorough cleaning of the vehicle surface, especially in the areas immediately above and below any trim pieces extending from the surface.

The spacers, whether for a brush or curtain, may be constructed of hollow lightweight material such as blow molded plastic. Annular spacers are preferably designed with removable key elements to provide circumferential gates which permit the spacers to be selectively applied to or removed from the encircling relationship with a brush shaft by lateral motion rather than only through endwise or axial de-stacking. An implement having spacers constructed according to the present invention can be easily rebuilt by loosening an axial clamp to permit spreading of the spacers whereby the individual cloth elements can be readily removed from their pin-type attachments and replaced with new elements. After all elements have been quickly and easily replaced, the implement is reconstructed into an integral unit by axial clamping and restored to the operative association with other vehicle laundry components.

These and other features, advantages, and objectives of the invention will be best understood from a reading of the following specification which describes an illustrative embodiment of the invention in detail.

DETAILED DESCRIPTION OF THE PREFERRED EMBODIMENT

Figure 1:
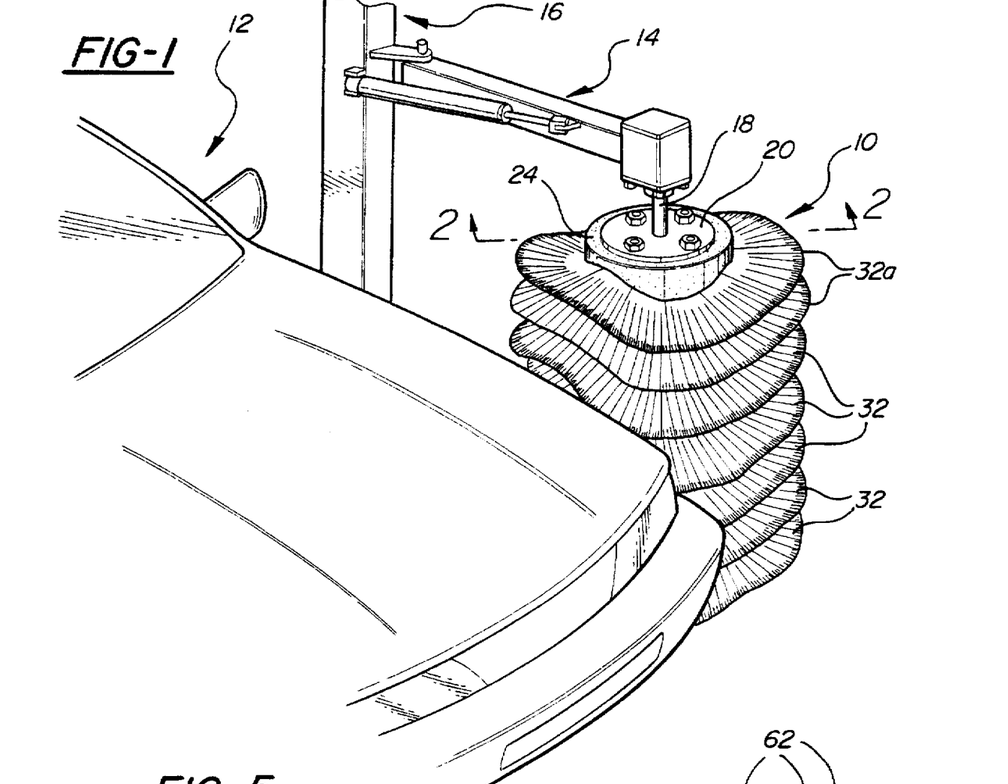
FIG. 1 is a perspective view of a vehicle laundry including a brush constructed and used according to the present invention.

In FIG. 1, a vehicle laundry brush 10 is installed as part of a vehicle laundry system wherein the brush is rotated by a motor (not shown) about an essentially vertical axis to contact an exterior surface of an automotive vehicle 12 passing through the laundry system. Brush 10 is carried by an arm 14 which is pivotally mounted on a support beam 16 adjacent the vehicle wash lane. It will be understood that the brush construction described hereinafter is not limited to a vertically mounted brush but may be employed in brushes operating in any orientation, for example as a horizontally mounted top brush.

Figure 2:
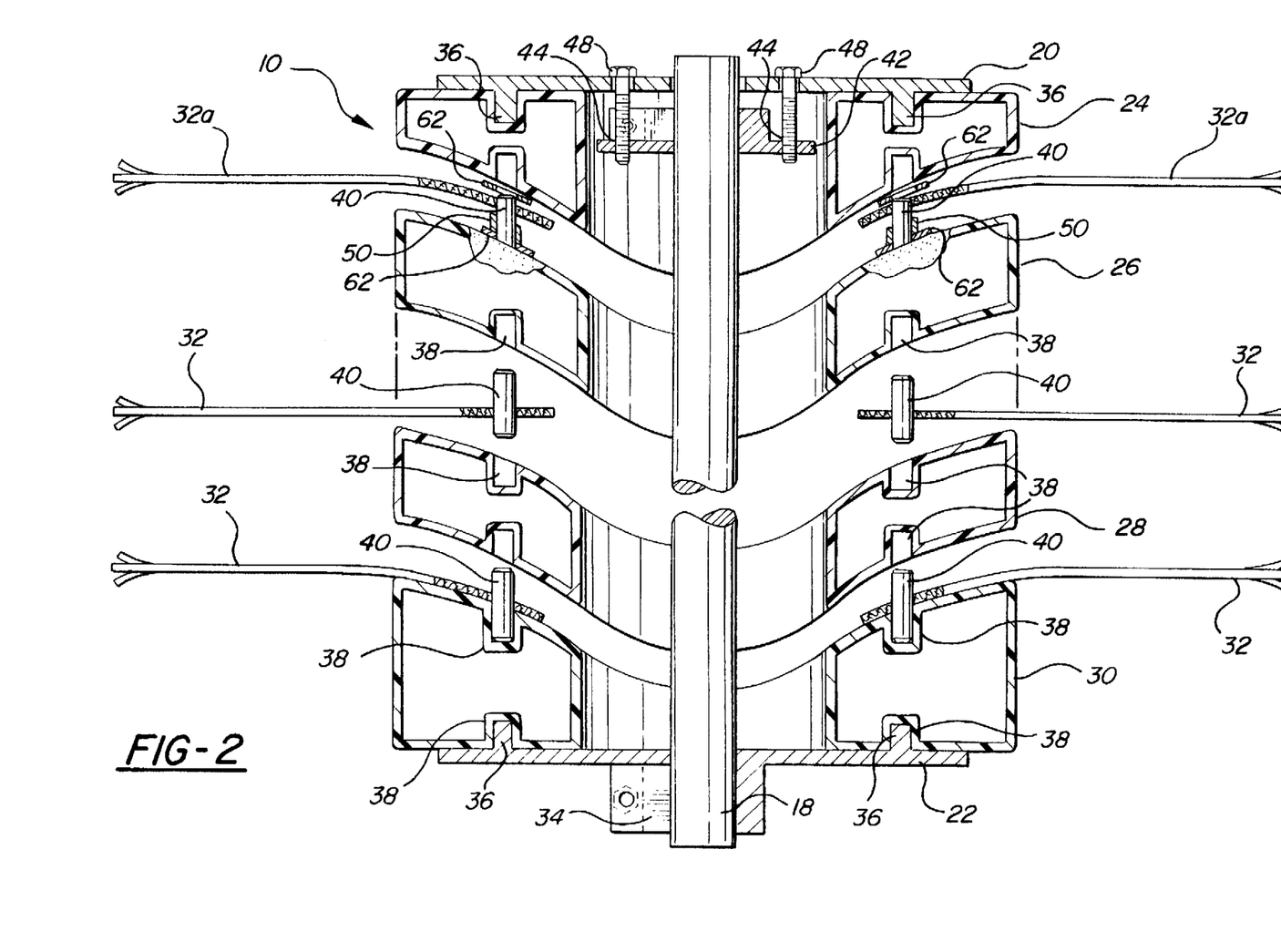
FIG. 2 is an assembly view, partly sectioned, of the brush assembly of FIG. 1.
Figure 3:
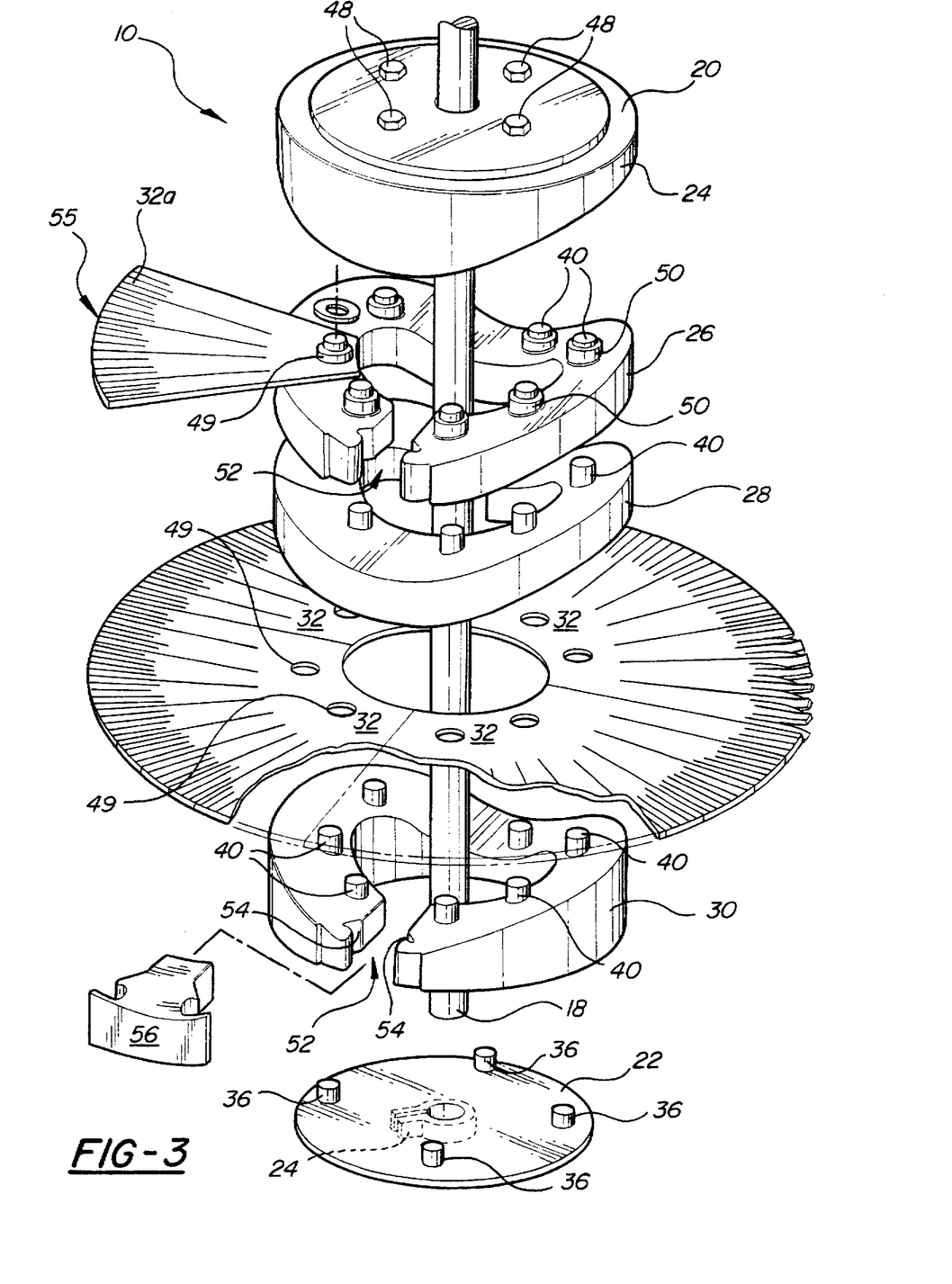
FIG. 3 is an exploded assembly view of the brush of FIG. 1.

As best seen in FIGS. 2 and 3, brush 10 comprises a shaft 18, opposite end plates 20, 22 of which only plate 22 is directly fixed to the shaft, a plurality of axially spaced, annular plastic spacers 24, 26, 28, 30 arranged in a stack to surround the shaft 18 between the end plates, and a plurality of synthetic felt brush elements 32, 32a disposed between the spacers and extending radially outwardly therefrom to contact the exterior surface of vehicle 12. Only some of the spacers and the brush elements in brush 10 are shown in FIGS. 1 and 2, it being understood that additional intermediate spacers may be required to build a brush of the desired length. One of the advantages of the disclosed structure is the modular construction design and the resulting flexibility to construct brushes of various lengths; the increments of available length correspond to the axial lengths of the spacers which is preferably on the order of 3 inches.

End plates 20, 22 are preferably fabricated of a lightweight metal such as aluminum. As shown in FIG. 2, plate 22 is provided with a split collar 34 which allows it to be clamped to shaft 18 near one end. Pins 36 extend axially from plate 22 into sockets 38 in the bottom of spacer 30 to ensure that spacer 30, shaft 18, and plate 22 rotate as a unit.

Spacers 24, 26, 28, and 30 are of hollow, plastic construction that may be economically produced by a blow-molding or rotocasting. Middle spacers 26, and 28 are molded such that both the upper and lower faces thereof have identical undulating or wave-like contours. Top spacer 24 and bottom spacer 30 each have one flat face oriented toward end plate 20, 22 respectively, with an undulating surface on the opposite side. Accordingly, when the spacers are stacked, the undulating faces of adjacent spaces fit together in a mating or interlocking fashion as indicated in FIG. 2.

Spacers 24, 26, 28, 30 each have a plurality of circumferentially spaced sockets 38 formed in the upper and lower surfaces thereof. When t he spacers are stacked in mating fashion as shown in FIG. 2, sockets 38 on adjacent faces of the spacers are aligned with one another and pins 40 are retained in each aligned pair of sockets so that adjacent spacers rotate together as a unit despite the fact that spacers 26 and 28 are not connected directly to shaft 18.

Pins 40 are preferably fixed by means of an adhesive into the sockets 38 of the upper faces of spacers 26, 28, 30, and slide freely into the mating sockets on the lower faces of the adjacent spacer when the spacers are stacked.

In a possible alternative embodiment of the invention, pins 40 may be molded integrally with the spacers 26, 28, 30. In this embodiment, all of the spacers are molded with sockets 38 in one surface and pins protruding from the opposite surface. The spacers may then be stacked with all of their pin-bearing sides facing in one direction, upward for example, such that the pins project into the sockets of the spacer located immediately above. The topmost spacer in such a stack does not have pins on its upper surface, but rather has sockets as does spacer 24 in FIG. 2, in order to receive pins 36 protruding from end plate 20.

Brush elements 32, 32a are disposed on pins 40, extending radially well beyond the outer spacer surfaces, and are driven by the pins so as to rotate with the spacers which lie adjacent to it. As hereinafter described, the brush elements may take various forms.

Additional spacers and additional brush elements 32, 32a may be added to the stack, each spacer being separable from but pinned to the adjacent spacers for common rotation about the axis of shaft 18.

An anchor plate 42 is located within the inner diameter of uppermost spacer 24 and has a split collar portion similar to collar 34 which allows it to be clamped to shaft 18. Threaded holes 44 arranged in a circle around shaft 18 receive machine screws 48 which extend through non-threaded holes in end plate 20. By first clamping the collar to shaft 18 and then tightening screws 48, the entire assembly of spacers and brush elements is secured axially and radially to rotate as a unit with shaft 18.

It will be apparent from FIG. 2 that the central portion of shaft 18 may be eliminated without loss of crucial function; i.e., the torque required to rotate the brush may be transmitted from the driver end of the shaft to the distal spacer through the pins 40 and spacers 24, 26, and 28. In this alternative arrangement, only stub shafts are required.

The brush 10 may be varied or "customized" not only in length but also in its operating characteristics and color by and through selection of the sizes, thicknesses, fabric content, length and mounting techniques of the elements 32, 32a.

Figure 4:
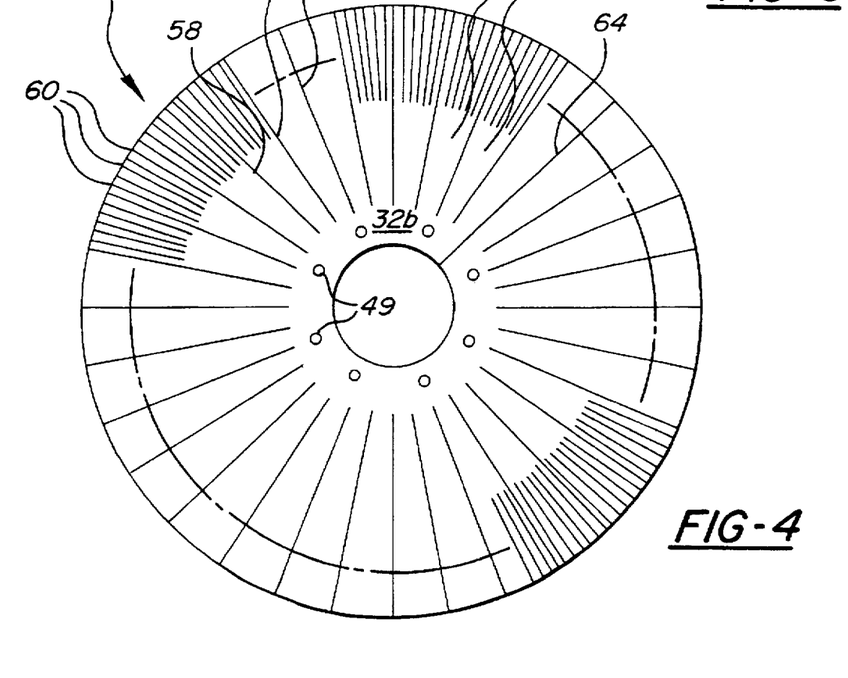
FIG. 4 is a plan view of circular brush element.
Figure 5:
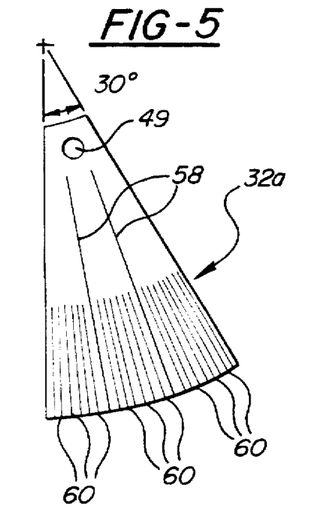
FIG. 5 is a plan view of a 30° brush element having a single mounting hole.
Figure 6:
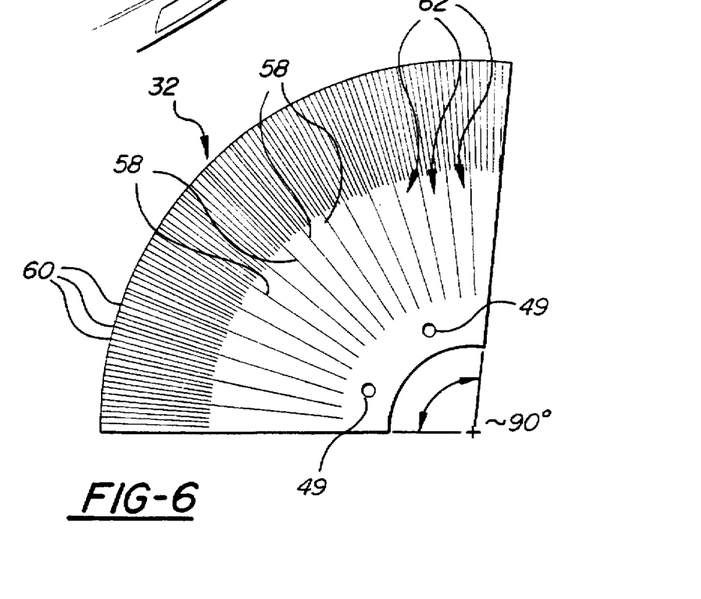
FIG. 6 is a plan view of a 90° brush element.
Figure 8:
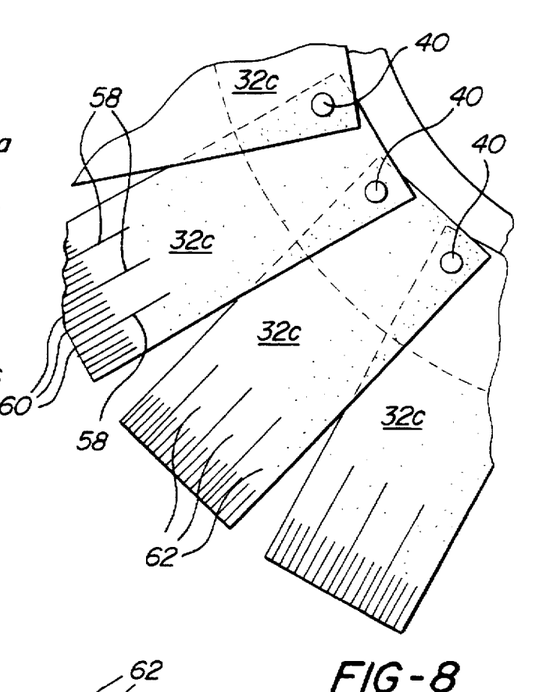
FIG. 8 is a plan view of a portion of an alternative brush spacer and element design.

By way of illustration, the brush elements may be full circles as shown in FIG. 4, quarter circles as shown in FIGS. 3 and 6, or even smaller portions of circles as shown in FIGS. 3 and 5 or rectangular as shown in FIG. 8. The elements may be polyester or other synthetic, non-woven, fibrous material available from numerous sources such as Ozite, National Felt, American Felt, Milliken and Buffalo Felt. The thickness of the elements may be varied to increase or decrease scrubbing action and color may be selected for source identification or aesthetics. In all cases, the elements are flat, unstitched components requiring no inserts, have at least one mounting/driving hole 49 formed near an inner edge and a plurality of slits die cut or otherwise formed in the body and running to an opposite, outer edge.

Figure 7:
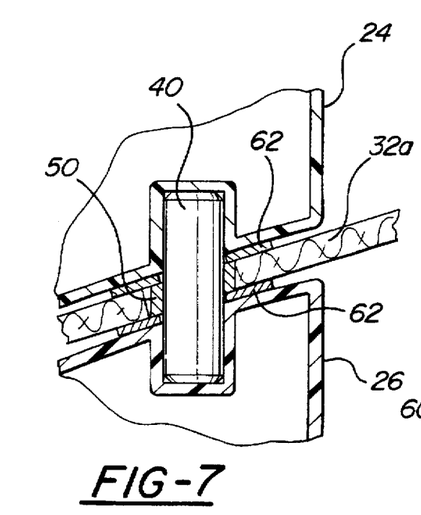
FIG. 7 is a cross-section through a spacer/mounting pin assembly in the upper portion of the brush of FIG. 1.

Pins 40 projecting from the uppermost spacer 26 are surrounded by bushings 50 as shown in detail in FIG. 7. Bushings 50 may be plastic, stainless steel or other suitable material.

Spacers 24, 26, 28, 30 are formed with a circumferential gate opening 52. Gates 52 are of a width greater than the diameter of shaft 18 and have notches 54 formed in the inner surfaces thereof. A key block 56 is provided to close each gate 52, the key blocks shaped to interlock with notches 54 when inserted into the gate openings.

Between each set of adjacent spacers lie synthetic felt brush elements 32, 32a arranged as discs or approximations thereof to rotate edge-wise around the brush shaft. As hereinafter shown with reference to FIGS. 4, 5, 6, and 8, the brush elements may vary considerably in shape but share some important common characteristics: (1) they comprise a flat, sheet-like body of synthetic felt material, preferably polyester, (2) they have a vehicle-contacting edge remote from the shaft when mounted, (3) they are of greater radial dimension than the brush spacers between which they lie, (4) they all have formed therein such as by die cutting at least one hole which serves to mount the element on a spacer pin and to provide a drive-force receptor, and (5) unlike prior art elements, they are all unstitched and are not folded about or attached to an insert of any kind. Although an element may be made as a full circle or annulus, it is preferable to cut the elements as smaller segments, to be assembled into discs, approximations of discs or curtains.

FIGS. 3 and 6 illustrate brush elements shaped as quarter circles, each element having two mounting/drive holes 49. FIGS. 3 and 5 illustrate brush elements 32a shaped as 30° sectors; FIG. 4 shows an element 32b in the shape of a full circle and FIG. 8 shows rectangular elements 32c. The 30° elements 32a are mounted on a spacers with gaps between them to only approximate a circle. Rectangular elements 32c are mounted on pins 40 in an overlapping fashion, with their outer ends having gaps therebetween.

Brush 10 of FIG. 2 is constructed to exhibit different operating characteristics as between the top and bottom portions; the top 14% of the brush is more compliant to prevent damage to vehicle appendages, such as mirrors, while the lower 86% of the brush is stiffer and provides a more vigorous scrubbing action.

In general, this is achieved by using 30° elements 32a with single mounting/driving holes 49 between the top two spacers 24 and 26, and by using 90° elements 32 with double mounting/driving holes 49 over the remainder of the brush.

Elements 32, 32a, 32b have a plurality of radially extending deep slits 58 formed around the circular outer peripheral edges thereof, and a plurality of shallow slits 60 are formed between adjacent deep slits. Accordingly, the outer periphery of each element 32, 32a, 32b is divided into a series of compound radial fingers 62, each consisting of a relatively wide and radially long finger which is subdivided into shorter and narrower sub-fingers. Rectangular elements 32c also have compound fingers 62 at their radially outer ends.

Element 32 is preferably die cut to have an included angle when lying flat of slightly greater than 90° so that when it is placed with four identical elements on the undulating face of a spacer and deformed to a non-planar shape they will cover a full 360°.

A pivoting brush element 32a, shown mounted on spacer 26 in FIG. 2 and separately in FIGS. 5 and 7, is an approximately 30° sector of a circle and has a single mounting/driving hole 49 formed therein. One pivoting element 32a is mounted on each of pins 40 so that eight elements approximate a circle of disc albeit with gaps therein. Holes 49 are of sufficient diameter to fit around bushings 50 when pivoting elements 32a are placed over pins 40. As shown in FIG. 7, the axial length of the bushings is greater than the thickness of the fabric material of the elements so that sufficient clearance is maintained between spacer 26 and the spacer 24 above it to prevent the brush elements from being pinched when the two spacers are mated. Washers 62 are positioned over pin 40 on either side if brush element 32a to reduce wear as the element pivots. This construction, shown best in FIG. 7, together with the gaps between adjacent elements, allows them to pivot and "give" to prevent damage to a mirror or the like. The rearward rotation of elements 32a actually serves to reduce brush diameter until the obstacle is passed.

The pivoting feature of brush elements 32a makes it less likely that the fingers 62 of the brush elements will cling to or snag on any irregularities present on the surface of a vehicle being washed. Such snagging can cause damage to the vehicle and/or breakage of the brush element itself. Snagging is most likely to occur on vehicle features such as side view mirrors, radio antennas, or door handles, and because such features are located near the upper portion of a vehicle side it is only necessary for the upper-most one or two brush elements of a side brush to have this pivoting feature. Fixed brush elements composed of elements 60 are more appropriate for the lower levels of the side brush unit since the lower part of a vehicle side is usually more heavily soiled and a fixed element, having elements that surround the full 360° of the brush as opposed to only 240° (8×30°) for a pivoting element, wipes more brush material against the vehicle surface in a single brush revolution than is the case with the pivoting elements.

As an alternative to the multiple element brush elements described above, it is possible to form a one-piece, circular brush element 32b as seen in FIG. 4. A slice 64 extends completely through the radius of brush element 32b to allow the element to be placed into or removed from an operative position on a spacer without completely disassembling the brush 10 in order to slide the element axially over shaft 18.

When brush 10 is fully assembled as shown in FIGS. 1 and 3, spacers 24, 26, 28, 30 are arranged in an axial stack with brush elements 32, 32a trapped therebetween. The undulating upper and lower faces of the spacers are complementally shaped so that the spacers nest together and force the brush elements to assume the same undulating shape. Pins 40 extending from the spacer faces pass through holes 49 in the brush elements 32, 32a and project into sockets 38 in the lower face of the adjacent spacer to positively position the spacers and the elements and transmit the drive force through the entire stack. Pins 36 on end plates 20, 22 engage sockets 38 in the flat end faces of top and bottom spacers 24, 30 with shaft 18 passing through the center of the stack of spacers. End plate 22 and anchor plate 42 are clamped to shaft 18, and machine screws 48 pass through holes in end plate 20 and are tightened into threaded holes 44 to compress the stack axially and thereby hold it together.

Figures 9, 12, 13:
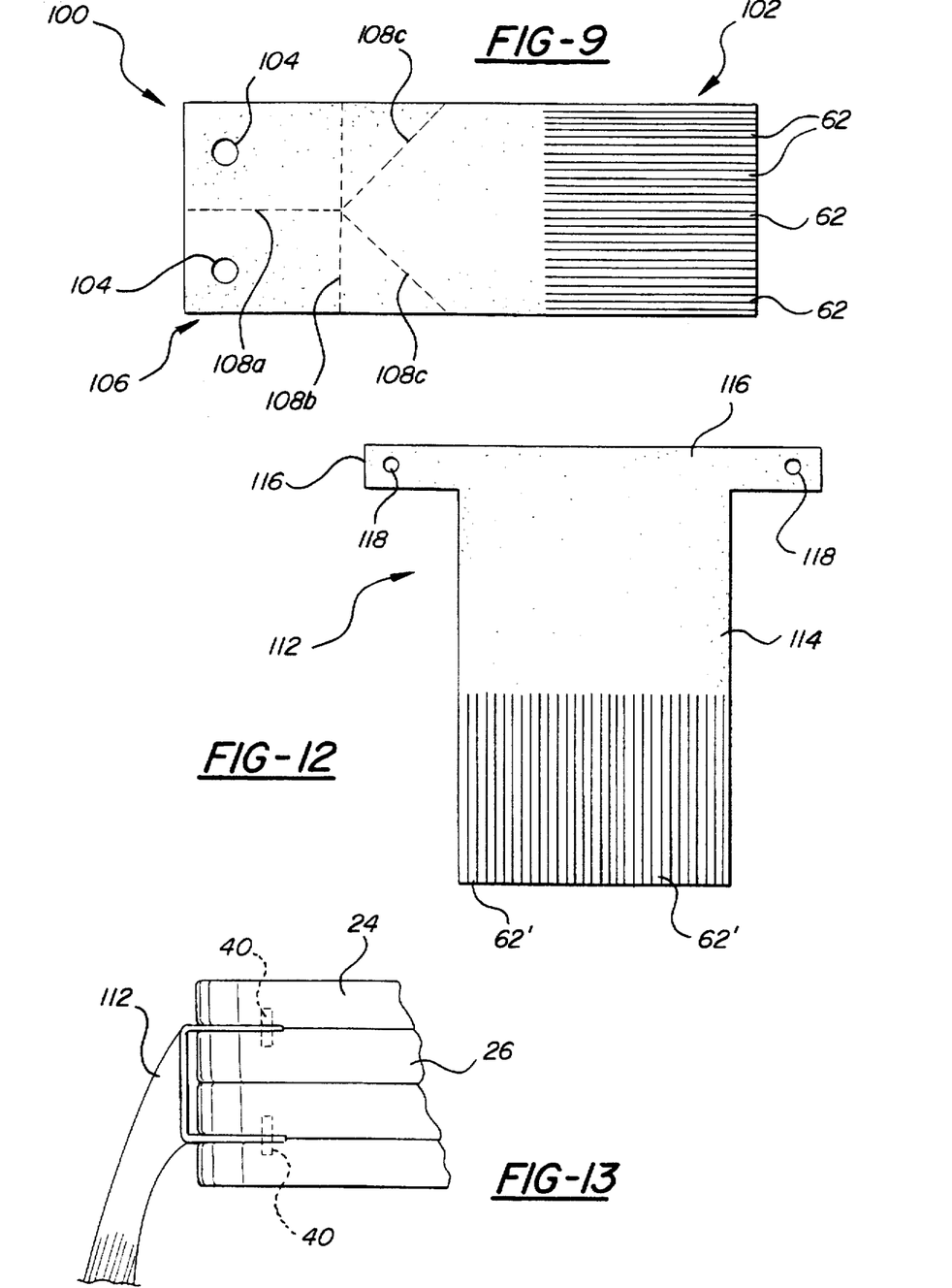
FIG. 9 is a plan view of a brush element adapted for facewise translation when used with the spacer/mounting pin assembly of the present invention.
FIG. 12 is a plan view of an alternative embodiment of a brush element adapted for facewise translation.
FIG. 13 is a perspective view of the brush element of FIG. 12 operatively mounted to the spacer/mounting pin assembly of the present invention.
Figures 10, 11, 14:
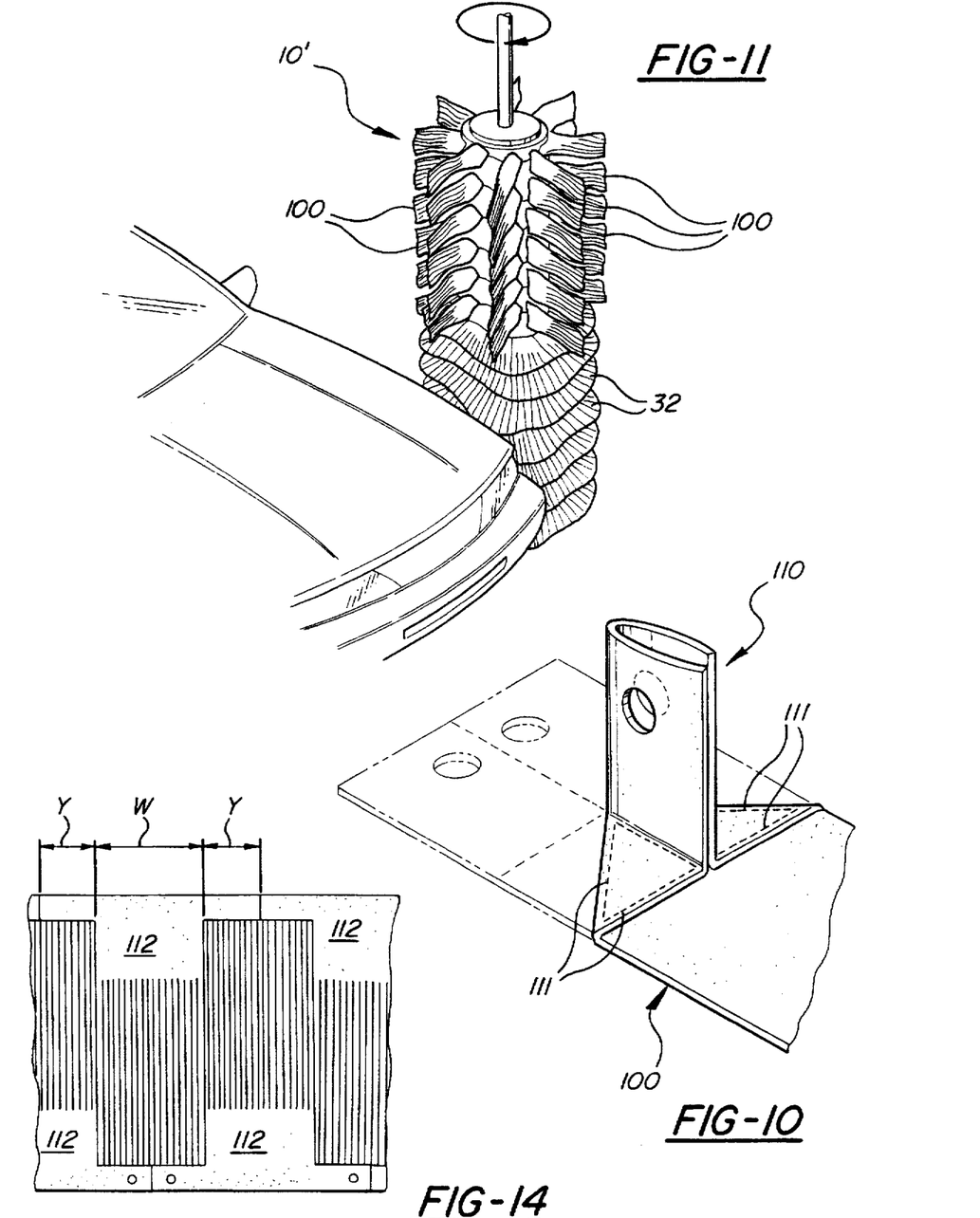
FIG. 10 is a perspective view of the brush element of FIG. 9 as folded before mounting to the brush.
FIG. 11 is a perspective view of a vehicle laundry brush having brush elements as shown in FIGS. 9 and 10 mounted adjacent its upper end and edgewise rotating brush elements mounted adjacent its lower end.
FIG. 14 is a plan view of a section of a sheet of material marked for cutting into a plurality of the brush elements shown in FIG. 12 and 13.

FIGS. 9 and 10 show an alternative brush element 100 which is adapted to translate in the more traditional facewise manner. Brush element 100 is die-cut from a sheet of cloth and is rectangular with fingers 62' along a vehicle-contacting end 102 and a pair of holes 104 adjacent an opposite mounting end 106. As indicated in FIG. 9, brush element 100 has a center fold line 108a extending from mounting end 106 part way down the longitudinal centerline of the element between holes 104, a cross fold line 108b extending across the full width of the element to form a T with the center fold, and angled fold lines 108c extending from the intersection of the T outward at 45° angles to the lateral edges of the element. Brush element 100 is folded along fold lines 108a, b, c to assume the configuration shown in FIG. 10, wherein mounting end 106 is folded over in face-to-face relationship with itself to form a mounting portion 110 which extends at right angles to the body of the element and has the two holes 104 in alignment with one another. Brush element 100 may be secured in the folded configuration by stitching 111, or may be left unstitched.

As an alternative, an adapter having the shape of the folded mounting portion 110 may be separately fabricated such as by injection molding plastic and fastened to cloth to form element 100.

Brush elements 100 are fully compatible with the spacer/mounting pin assembly of the present invention as described hereinabove, and FIG. 11 shows brush elements 100 assembled as part of such a brush 10'. The aligned holes 104 in mounting portions 110 fit over the pins between the spacers of brush 10' so that the body of brush element 100 lies is a plane generally parallel with the axis of shaft 18 and translates in a facewise direction as the brush rotates. It is to be noted that brush 10' has edge-wise rotating elements 32 mounted between the spacers adjacent its lower end, and a brush may be constructed having any desired vertical distribution of edge-wise and facewise translating elements. It has been found that facewise translating elements sometimes are superior to edgewise translating elements in cleaning the upper portions of a car, i.e. the windows.

FIG. 12 shows an alternative embodiment of a brush element also adapted for facewise translation. Brush element 112 is generally T-shaped, having a vehicle contact portion 114 with fingers 62' and a pair of laterally extending mounting ears 116 with holes 118 formed therein. Element 112 is mounted to a brush having the spacer/mounting pin construction of the present invention as shown in FIG. 13, the holes in mounting ears 116 being retained by pins 40 on opposite sides of a spacer 26. Element 112 may be made wide enough to span more than one spacer if desired.

Brush elements 112 may be manufactured with a minimum of wastage of material if they are cut from a sheet of material in the manner shown in FIG. 14. Note that this requires that the vehicle contact portion 114 of each element have a width W that is twice the width Y of each mounting ear 116.

A facewise translating brush element may also be constructed by forming the body portion and the mounting portion as separate pieces, and subsequently connecting the two pieces so that the mounting portion extends out of the plane of the body. The mounting portion has mounting holes formed therein for engagement with one or more pins 40, may be formed from fabric, plastic or any other appropriate material, and may be fastened to the body by sewing, rivets, or the equivalent.

OPERATION

A brush according to the present invention is constructed by attaching the end plate 22 to a shaft 18 of selected length and thereafter building up alternate layers of hollow spacers 24, 26, 28, 30 and fabric brush elements 32, 32a until a brush of the desired length is achieved. The last spacer 24 is placed at the top of the brush and the entire assembly is axially compressed to the desired degree by rotating screws 48 with an appropriate tool.

Assuming a brush with uniform scrubbing characteristics over its axial length is desired, all of the spacers 24, 26, 28, and 30 will be of essentially the same axial dimension and all of the brush elements will be of the same shape, thickness, color, material, and slit configuration. Moreover, all of the cloth elements will be of the two-hole design so that they are non-pivotable in the plane of the adjacent spacer faces. In this construction, the bushings 50 described with reference to FIG. 7 are essentially optional as the minimal movement between brush element and mounting pin is such as to produce minimal wear on the surface of the pin.

Assuming a brush of non-uniform character is desired; i.e., a brush which is softer and more compliant near the top portion thereof, the brush is constructed in the fashion described above but only until the last one, two, or three tiers of brush elements are reached. At this point, a softer, less vigorous scrubbing action may be achieved by using thinner brush elements with deeper or more numerous slits or, where a brush of maximum compliance is desired, the brush elements may be arranged in the gapped fashion by using the 30° element 32a shown in FIG. 5 and through the further use of bushings 50 and washers 62 on the mounting pins 40 to permit limited rotation of the elements relative to the faces of the adjacent spacers. As described above, the bushings not only maintain an axial space between the spacers themselves such as to avoid any binding or squeezing which would prevent relative rotation of the brush elements but also serve to reduce wear on the external surface of the mounting pins due to relative rotation of the brush elements.

It is also possible to construct a brush wherein one or more tiers of brush elements translate facewise for enhanced contact with the surface being washed. This is achieved by mounting elements 100 or 112 between spacers at the desired vertical location of the brush, with mounting portions 110 or mounting ears 116 respectively between the spacers and retained in connection therewith by pins 40.

The brush is otherwise mounted for rotation about an appropriate axis, either vertical or horizontal, and 10 driven by an electric or hydraulic motor either directly or through a gear box as will be apparent to those skilled in the vehicle laundry machinery arts.

To rebuild a brush it is necessary only to essentially loosen the axial stack structure through rotation of screws 48 sufficiently to separate the spacers from one another by the protruding length of the interconnecting pins 40 such that the brush elements may be removed from the pins and individually replaced. This may or may not require the removal of anchor plate 27. Screws 48 are then retightened to urge the spacers back into mating engagement, thus completing the rebuilding of the brush.

Spacers 24, 26, 28, 30 are also easily removable and replaceable by virtue of gates 52. Any spacer may be individually removed from shaft 18 by first spreading the spacers apart as in the process described above, then removing key block 56 from the spacer to open gate 52. The spacers need be spread apart only an amount slightly greater than the axial thickness of the spacer. The spacer is then moved radially with respect to shaft 18, with the shaft passing through gate 52 as the spacer is removed. A spacer is reinstalled in the stack by reversing the above procedure. The cleaning length of brush 10 may be quickly and easily varied as desired by adding or subtracting spacers and brush elements.

Although only the radially protruding portions of the brush elements 32, 32a, 100, 112 normally contact the vehicle during a polishing or washing operation, inadvertent or accidental heavy contact is unlikely to result in damage to the vehicle as a result of the softness and radial compliance of the hollow plastic spacers 24, 26, 28, and 30; i.e., the brush core has a springy or soft characteristic which yields on inadvertent contact with the vehicle.

The undulating shape of the brush elements when installed on the spacers results in an increase, as compared with planar brush elements, in the length of the area contacted by the element as the brush rotates. Accordingly, a smaller number of brush elements are required to form a brush of a given axial length, while avoiding the phenomena known in the vehicle laundry field as "striping." Striping occurs when brush elements are spaced so far apart from one another along the shaft axis that they do not overlap when they contact the surface being cleaned, and so clean only discrete stripes of the surface and leave uncleaned stripes between.

To completely eliminate the possibility of striping, it is possible to form the spacers so that axial overlap between axially adjacent brush elements is guaranteed. To achieve this, the amplitude of the wave shape of the spacers is made large enough so that the uppermost point of the top face of a spacer is higher than the lowermost point of the bottom face of the spacer located immediately above it in the stack.

Another benefit arising from the undulating configuration of the brush elements is that as vehicle 12 moves perpendicular to the rotational axis of brush 10, every point on the surface of the vehicle experiences both an upward and a downward sweeping motion by element fingers 62, 62'. This yields a more thorough cleaning of the surface, especially in the areas immediately above and below any trim pieces extending from the vehicle surface.

It will be appreciated that the drawings and descriptions contained herein are merely meant to illustrate a particular embodiment of the present invention and are not meant to be limitations upon the practice thereof, as numerous variations will occur to persons of skill in the art.

What is claimed is:

1. A replaceable element for a cloth-type vehicle laundry implement wherein brushes rotate in an edge-wise manner, the element having an overall shape of a sector of a circle and having opposite, parallel, plane faces, being made of non-woven, synthetic fabric and having a first vehicle-containing peripheral edge, said element being subdivided into compound radial fingers extending to said edge by a first set of relatively widely spaced slits of a first length and a second set of relatively closely spaced slits intermediate the first slits and of a second length, the first length being substantially greater than the second length.

2. An element as defined in claim 1 further including a hole formed in an unslit portion of the element and extending between opposite faces to receive a drive element.

3. An element as defined in claim 1 further including two adjacent holes formed in an unslit portion of the element to receive drive pins.

4. A cloth-type vehicle laundering element comprising:
   support means defining an axis of rotation;
   a plurality of parallel, adjacently arranged spacers mounted on said support means;
   each spacer having at least one face in matable, adjacent relationship with a face of an adjacent spacer; and
   a plurality of predominantly flat fabric brush elements disposed between the mating faces of said spacers and extending outwardly beyond said spacers for edgewise translation with said spacers and said support means as a unit; wherein the axial thickness of said spacers and substantially greater than the thickness of said elements such that the elements are axially spaced apart by a substantial distance as compared to the thickness of said elements, further wherein the spacers are hollow plastic bodies.

5. Apparatus as defined in claim 4 further comprising means for urging said spacers together.

6. Apparatus as defined in claim 4 further including means for interconnecting adjacent spacers.

7. Apparatus as defined in claim 6 wherein said interconnecting means comprises pins extending between adjacent spacers, each of said elements having at least one hole formed therein for receiving a pin and being driven edgewise thereby.

8. Apparatus as defined in claim 7 wherein each pin is secured in essentially permanent relationship with one spacer and extends into removable relationship with the adjacent spacer.

9. Apparatus as defined in claim 4 wherein said spacers are of annular shape and at least some of the spacers have circumferential gate openings to permit spacers to be placed in and removed from surrounding relationship with a shaft by radial translation.

10. Apparatus as defined in claim 4 wherein said spacers are substantially rigid and said faces are non-planar.

11. Apparatus as defined in claim 4 wherein said brush elements have radially subdivided outer ends.

12. Apparatus as defined in claim 11 wherein the brush elements exhibit a compound pattern of radial fingers characterized by relatively wide and radially deep fingers the outer end portions of which are subdivided into relatively narrow and radially more shallow sub-fingers.

13. Apparatus as defined in claim 4 wherein at least one of the brush elements is made up of individual pie-shaped segments.

14. A laundry implement comprising:
   support means;
   a plurality of hollow plastic spacers arranged in parallel, adjacent relationship for movement and having adjacent matable faces; and
   a plurality of flat cloth elements having opposite plane faces disposed between said spacers for movement therewith.

15. Apparatus as defined in claim 14 wherein each said cloth element comprises a body of unstitched, unfolded material an outer peripheral edge of which extends beyond said spacers, said body having at least one mounting hole formed between said faces in a portion which lies between adjacent spacers.

16. Apparatus as defined in claim 15 further including a pin passing through said hole whereby said elements are pivotable about said pins.

17. Apparatus as defined in claim 14 wherein the spacers are annular and the cloth elements are subdivided into a plurality of uniformly circumferentially arranged relatively long and wide fingers, each of said long and wide fingers being subdivided over only the radially outermost portion thereof into smaller sub-fingers.

18. Apparatus as defined in claim 14 further including means for urging said spacers axially toward one another.

19. A cloth-type vehicle laundering implement comprising:
   support means;
   a plurality of parallel, adjacently arranged spacers mounted on said support means, each spacer having at least one face in matable, adjacent relationship with a face of an adjacent spacer; and
   a plurality of flat fabric brush elements disposed between the mating faces of each pair of adjacent spacers to form a plurality of substantially circular brushes extending outwardly beyond said spacers for edgewise translation with said spacers and said support means as a unit, at least one of said brush elements having a radially subdivided outer end.

20. A replaceable element for a cloth-type vehicle laundry brush having opposite, parallel, plane faces, the element made of non-woven, synthetic fabric and having a first vehicle-contacting peripheral edge, said element being subdivided into compound radial fingers extending to said edge by a first set of relatively widely spaced slits of a first length and a second set of relatively closely spaced slits intermediate the first slits and of a second length, the first length being substantially greater than the second length, and the element further including a hole formed in an unslit portion of the element and extending between opposite faces to receive a drive element.

21. A replaceable element for a cloth-type vehicle laundry brush having opposite, parallel, plane faces, the element made of non-woven, synthetic fabric and having a first vehicle-contacting peripheral edge, said element being subdivided into compound radial fingers extending to said edge by a first set of relatively widely spaced slits of a first length and a second set of relatively closely spaced slits intermediate the first slits and of a second length, the first length being substantially greater than-the second length, and the element further including two adjacent holes formed in an unslit portion of the element to receive drive pins.

22. A cloth-type laundering implement comprising:
   support means;
   a plurality of parallel, adjacently arranged spacers mounted on said support means, each spacer having at least one face in matable, adjacent relationship with a face of an adjacent spacer, the spacers being hollow plastic bodies; and
   a plurality of flat fabric brush elements disposed between the mating faces of said spacers and extending outwardly beyond said spacers for edgewise translation with said spacers and said support means as a unit.

23. A cloth-type laundering implement comprising:
   support means comprising a shaft;
   a plurality of parallel, adjacently arranged spacers mounted on said support means, each spacer having at least one face in matable, adjacent relationship with a face of an adjacent spacer, said spacers being of annular shape and at least some of the spacers having circumferential gate openings to permit spacers to be placed in and removed from surrounding relationship with said shaft by radial translation; and a plurality of flat fabric brush elements disposed between the mating faces of said spacers and extending outwardly beyond said spacers for edgewise translation with said spacers and said support means as a unit.

24. A cloth-type laundering implement comprising:

support means;

a plurality of parallel, adjacently arranged spacers mounted on said support means, each spacer having at least one face in matable, adjacent relationship with a face of an adjacent spacer; and a plurality of flat fabric brush elements disposed between the mating faces of said spacers and extending outwardly beyond said spacers for edgewise translation with said spacers and said support means as a unit, said brush elements having radially subdivided outer ends and exhibiting a compound pattern of radial fingers characterized by relatively wide and radially deep fingers the outer end portions of which are subdivided into relatively narrow and radially more shallow sub-fingers.

* * * * *